(12) United States Patent
Hameed (10) Patent No.: US 7,636,042 B2
(45) Date of Patent: Dec. 22, 2009

(54) BATTERY LIFE IMPROVEMENT FOR WIRELESS DEVICES THROUGH ACTIVITY REPORT COMBINING

(75) Inventor: Muhammad Hameed, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 132 days.

(21) Appl. No.: 11/440,193

(22) Filed: May 24, 2006

(65) Prior Publication Data

US 2007/0275677 A1 Nov. 29, 2007

(51) Int. Cl.
- G08B 1/08 (2006.01)
- G08B 23/02 (2006.01)
- G05B 23/02 (2006.01)

(52) U.S. Cl. ............... 340/539.3; 340/693.3; 340/3.71

(58) Field of Classification Search ............... 455/557; 340/539.3, 500–505, 539.1, 539.11, 540, 340/635, 636.1, 636.19, 3.1, 3.71
See application file for complete search history.

(56) References Cited

U.S. PATENT DOCUMENTS

| | | | | |
|---|---|---|---|---|
| 4,286,331 A | * | 8/1981 | Anderson et al. ........... | 340/541 |
| 5,331,353 A | * | 7/1994 | Levenson et al. ........... | 725/29 |
| 6,023,147 A | * | 2/2000 | Cargin et al. ............... | 320/114 |
| 6,952,578 B1 | * | 10/2005 | Pedersen et al. ........... | 455/414.2 |
| 6,985,755 B2 | | 1/2006 | Cadieux et al. | |
| 6,993,049 B2 | * | 1/2006 | Davies ....................... | 370/528 |
| 2002/0028657 A1 | * | 3/2002 | Davies ....................... | 455/41 |
| 2003/0197620 A1 | * | 10/2003 | Radousky .................. | 340/635 |
| 2005/0057519 A1 | * | 3/2005 | Coe et al. ................... | 345/168 |
| 2005/0240692 A1 | * | 10/2005 | Li ............................... | 710/62 |
| 2007/0060355 A1 | * | 3/2007 | Amaitis et al. ............. | 463/40 |

* cited by examiner

*Primary Examiner*—Jennifer Mehmood
(74) *Attorney, Agent, or Firm*—Brake Hughes Bellermann LLP (57) ABSTRACT

Various embodiments are disclosed relating to wireless systems, and also relating to battery life improvement for wireless devices through activity report combining. According to an example embodiment, a method is provided. The method may include determining a reporting period, detecting user activity at each of a plurality of detection points within the reporting period, and transmitting a message for the reporting period over a wireless link to report the detected user activity for the plurality of detection points.

15 Claims, 6 Drawing Sheets

BATTERY LIFE IMPROVEMENT FOR WIRELESS DEVICES THROUGH ACTIVITY REPORT COMBINING

BACKGROUND

Computing devices, such as personal computers, laptops, cell phones, etc., often include interface devices, such as a keyboard, mouse, joystick, etc., to allow a user to provide input or control an application on the host computer or computing device. Wireless interface devices have become more popular, and allow users to control and provide input to the host computer, while freeing users from the entanglement and limitations of traditional wired interface devices. However, a disadvantage of wireless interface devices is a limited battery lifetime for the interface device. Various circuits in the interface device may remain in a sleep or low power state during certain periods to conserve battery power. The interface device may consume significant battery power while it is in a high power state to perform some functions, such as, detecting user activity and/or transmitting an activity report to the host computer. However, some applications or devices are requiring a higher frequency of data reporting to the host computer, which can significantly decrease battery life. Therefore, there may be a need for techniques to improve battery life for wireless devices.

SUMMARY

Various embodiments are disclosed relating to wireless systems, to power control techniques for wireless devices, and to battery life improvement for wireless devices through activity report combining.

According to an example embodiment, a method is provided. The method may include determining a reporting period, detecting user activity at each of a plurality of detection points within the reporting period, and transmitting a message for the reporting period over a wireless link to report the detected user activity for the plurality of detection points.

In another embodiment, an apparatus may be provided. The apparatus may include a wireless interface. The wireless interface may be configured to determine a reporting period, detect user activity at each of a plurality of detection points within the reporting period, and transmit a message for the reporting period over a wireless link to report the detected user activity for the plurality of detection points. For example, the apparatus may include an interface device, such as a human interface device (HID). The apparatus may include, for example, a sensor, a controller and/or a wireless interface.

According to another example embodiment, another method is provided. The method may include receiving a message via wireless link for a reporting period. The message may indicate user activity for each of a plurality of detection points within the reporting period. The method may also include updating an application based on the message. For example, a host computer or other device may receive a message from a device such as a wireless HID, where the message may indicate user activity associated with the HID for each of a plurality of detection points.

DETAILED DESCRIPTION

Figure 1:
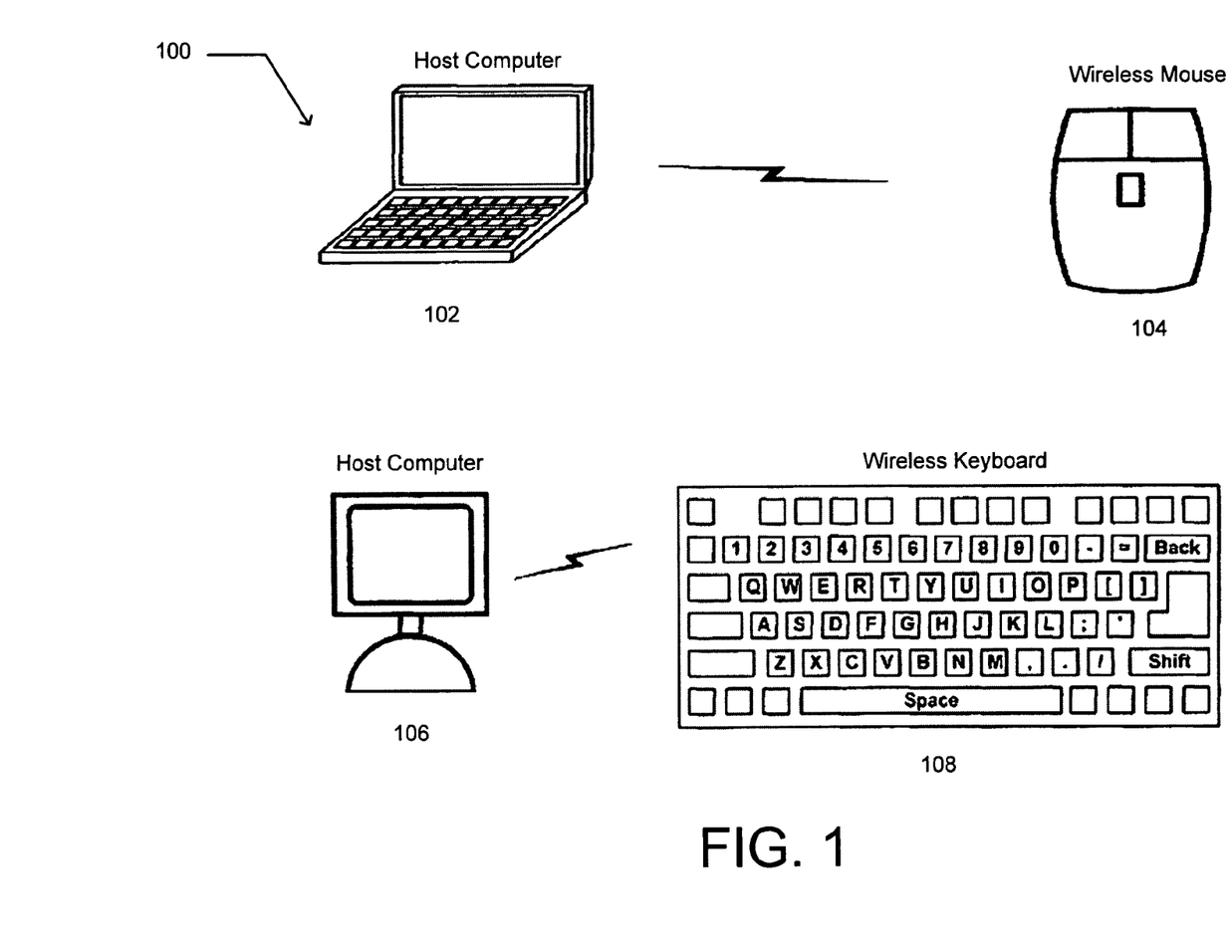
FIG. 1 is a diagram of a system according to an example embodiment.

FIG. 1 is a block diagram of a system 100 according to an example embodiment. FIG. 1 illustrates a host computer or other computing device that may be wirelessly coupled to a human interface device (HID) In an example embodiment, a host computer 102, for example a laptop computer, may be wirelessly coupled to a wireless human interface device (HID), for example, a wireless mouse 104. In another example embodiment, a host computer 106, for example a personal computer, may be wirelessly coupled to a wireless keyboard 108. Mouse 104 and keyboard 108 are example HIDs, and any type of HID or other wireless device may be used.

Wireless HIDs, such as the wireless mouse 104 and the wireless keyboard 108 for example, free users from the wires and entanglement offered by traditional wired interface devices. FIG. 1 uses the wireless mouse 104 and wireless keyboard 108 as examples of wireless HIDs, however almost any traditional interface device may be implemented as a wireless HID, including but not limited to, for example, a mouse, keyboard, joystick, game controller, remote control, monitor, headset, television or any other device configured to receive input from or communicate output to a user.

Similarly, the host computer with which the HID is wirelessly coupled may be any type of computing device or computer, including but not limited to, for example, a laptop computer, personal computer, network device, cellular phone, personal digital assistant (PDA), gaming device, handheld communications device, or any other device configured to be wirelessly coupled to a HID or other device.

Figure 2:
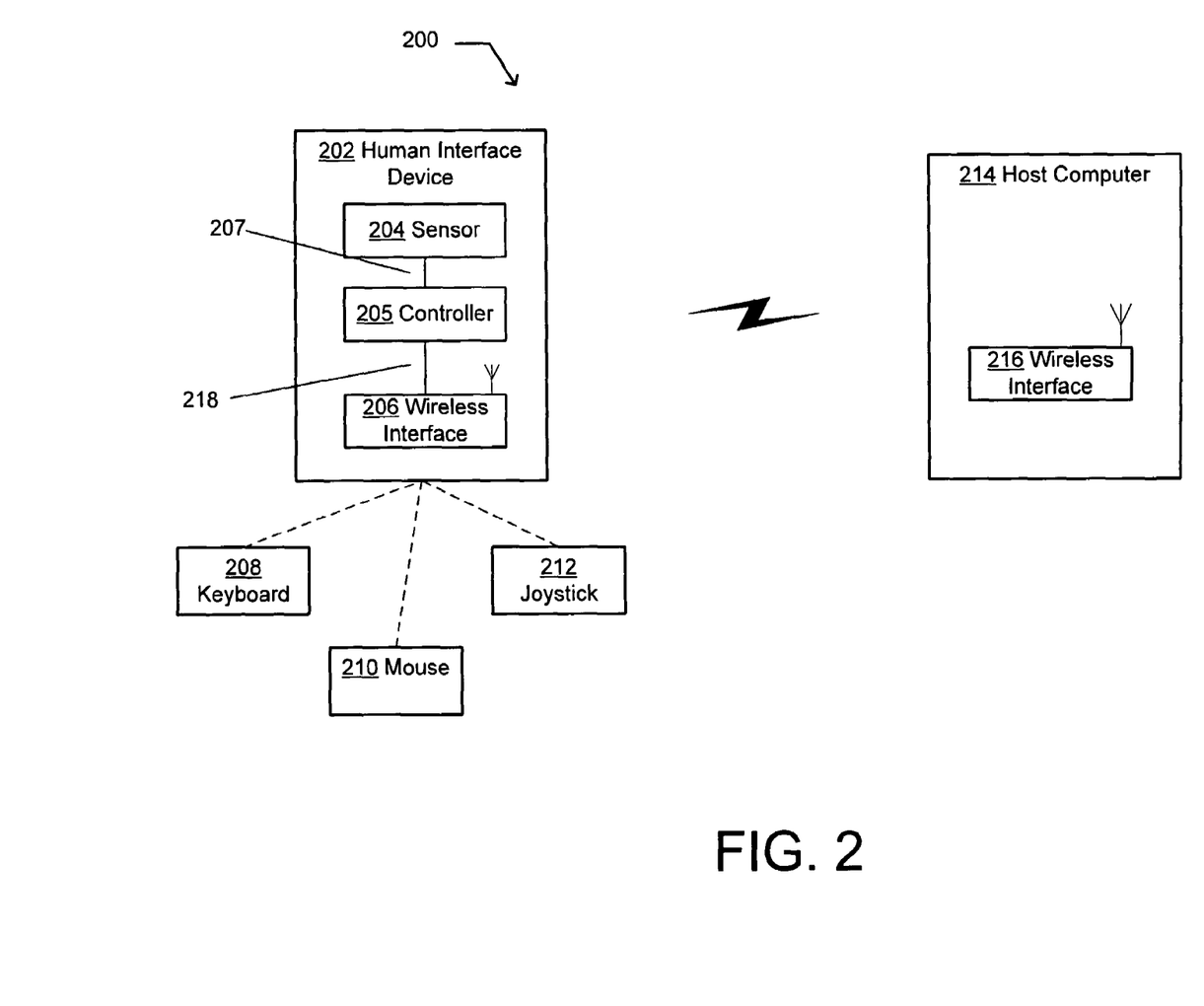
FIG. 2 is a block diagram of a system according to another example embodiment.

FIG. 2 is a block diagram of a system 200 according to another example embodiment. A wireless human interface device (HID) 202, may be any human interface device, including, for example, a keyboard 208, a mouse 210, a joystick 212, or any other interface device.

In an example embodiment, HID 202 may include a sensor 204, a controller 205 and a wireless interface 206. Sensor 202 may sense or track user activities associated with the HID 202, including but not limited to, for example, one or more keystrokes, a joystick action, or a mouse movement. For example, sensor 204 may be an optical sensor provided in an optical mouse to track X-Y motion of the mouse or identify an X-Y location of the pointer. Other types of sensors may be used. In one embodiment, although not required, information identifying user activities sensed or tracked by sensor 204 may be stored in a buffer or memory, not shown.

Controller 205 may be coupled to sensor 202 via line 207, and may control overall operation of HID 202. Wireless interface 206 may be coupled to controller 205 via line 218, and may wirelessly transmit and receive information.

A host computer 214, which may be any computing device, may include a processor or controller and memory (not shown), as well as a wireless interface 216 for wirelessly transmitting and receiving information. Host computer 214, via wireless interface 216, may establish a wireless link or connection with HID 202 or be in wireless communication with HID 202, via wireless interface 206.

In general operation, sensor 204 may sense user activity at the HID 202 or associated with HID 202, such as tracking mouse or cursor movement or location, key presses on a keypad or keyboard, joystick movement, etc. Controller 205 may, from time to time, detect user activity associated with HID 202 by occasionally polling sensor 204 to detect or obtain the user activity associated with HID 202, such as an updated X-Y pointer location from a mouse. Alternatively, controller 205 may occasionally receive an interrupt from sensor 204 in response to sensor 204 sensing user activity, for example. Other techniques may be used to allow controller 205 to detect user activity associated with HID 202. The wireless interface 206 of the HID 202 may then, for example, transmit a message or packet to the host computer 214 via wireless interfaces 206 and 216, to report the detected user activity.

User activity may be detected and reported to the host computer once every reporting period, for example. This may involve, for example, controller 205 detecting user activity from sensor 204 and then transmitting a message to the host computer 214 via wireless interfaces 206 and 216, to report the detected user activity. Thus, this may include, for example, a 1:1 ratio of one activity detection per reporting period. However, in such a case, to improve performance at the host computer 214, shorter reporting periods (or increased reporting frequency to the host computer) may be used. This may cause the HID 202 to spend more time overall in a relatively high power state to transmit messages over a wireless link to host computer 214. The radio frequency (RF) activity of HID 202 transmitting a message over a wireless link may typically be a relatively high power activity, and may typically consume significant battery power by HID 202. Therefore, providing a shorter reporting period or increasing the reporting frequency, with one activity detection per reporting period, may provide improved performance at the host computer but likely at the expense of reduced battery life for HID 202, in some cases. Also, by decreasing the reporting period or increasing the reporting frequency for HID 202, an increased percentage of the available wireless bandwidth between HID 202 and computer 214 may be consumed by the HID activity reporting, in some cases.

Therefore, in another example embodiment, controller 205 may detect user activity at each of a plurality of detection points within a reporting period. HID 202 may then transmit a message over a wireless link to host computer 214 to report the detected user activity for the plurality of detection points. In this manner, according to an example embodiment, a plurality of activity detection points may be used within a reporting period, and then activity reports may be transmitted together or combined together for transmission within a message or over one RF activity, for example. Activity reports for multiple activity detection points within a reporting period may be combined and transmitted together, for example, at the end of a reporting period. The activity reports may be transmitted within one packet or multiple packets, for example.

Thus, in an example embodiment, the wireless interface 206 may transmit one or more messages for a reporting period. Each message may include a single or multiple activity reports, corresponding to activity detected at a plurality of detection points within a reporting period. Based upon the message(s) received by the wireless interface 216, the host computer 214 may then update the state of any application, program or device that is associated with the HID 202 or receiving data from HID 202.

For example, the host computer 214 may be a personal computer running a word processing document which is awaiting input from the human interface device 202, which may be for example a wireless keyboard 208. Then for example, a user may enter a keystroke of "a." The sensor 204 may sense the keystroke "a" and may record the keystroke in a buffer, and provide the keystroke information to controller 205, e.g., via polling from controller 205 at a first detection point. A user may input a keystroke of "b" for example. Sensor 204 may sense this keystroke and may provide this keystroke information to controller 205 when polled at a second detection point, for example. In an example embodiment, the wireless interface 206 may then transmit a message via wireless link to the wireless interface 216 of host computer 214. This transmitted message may therefore report the detected user activity of keys "a" and "b" in this example, as a combined activity report for the two detection points within the one reporting period. The message may be transmitted as one packet to report user activity for both detection points, or as multiple packets, e.g., one packet for each detection point (e.g., each packet providing one of the activity reports). Thus the message may include information indicating that both keys "a" and "b" were pressed. Or the message transmitted by wireless interface 206 may include a first packet indicating that the "a" key was pressed, and a second packet indicating that the "b" key was pressed. Upon receipt of the message, host computer 214 may update the word processing program or other application with the user activity of keystroke "a." and "b," for example.

This is merely an example. Regardless whether the message includes one packet or multiple packets, the message may, for example, be transmitted during one wireless or radio frequency (RF) activity or transmission to conserve battery power. In this manner, performance may be improved at the host computer 214 using approximately a same battery consumption, because user activity for multiple detection points may be reported or provided to host computer 214 for each reporting period. Alternatively, using this technique, a same or similar performance may be provided with improved battery life, since a message or RF activity may be used each reporting period to transmit multiple activity reports, thereby reducing overall time that the device may operate in a high power state, at least in some cases.

Figure 3:
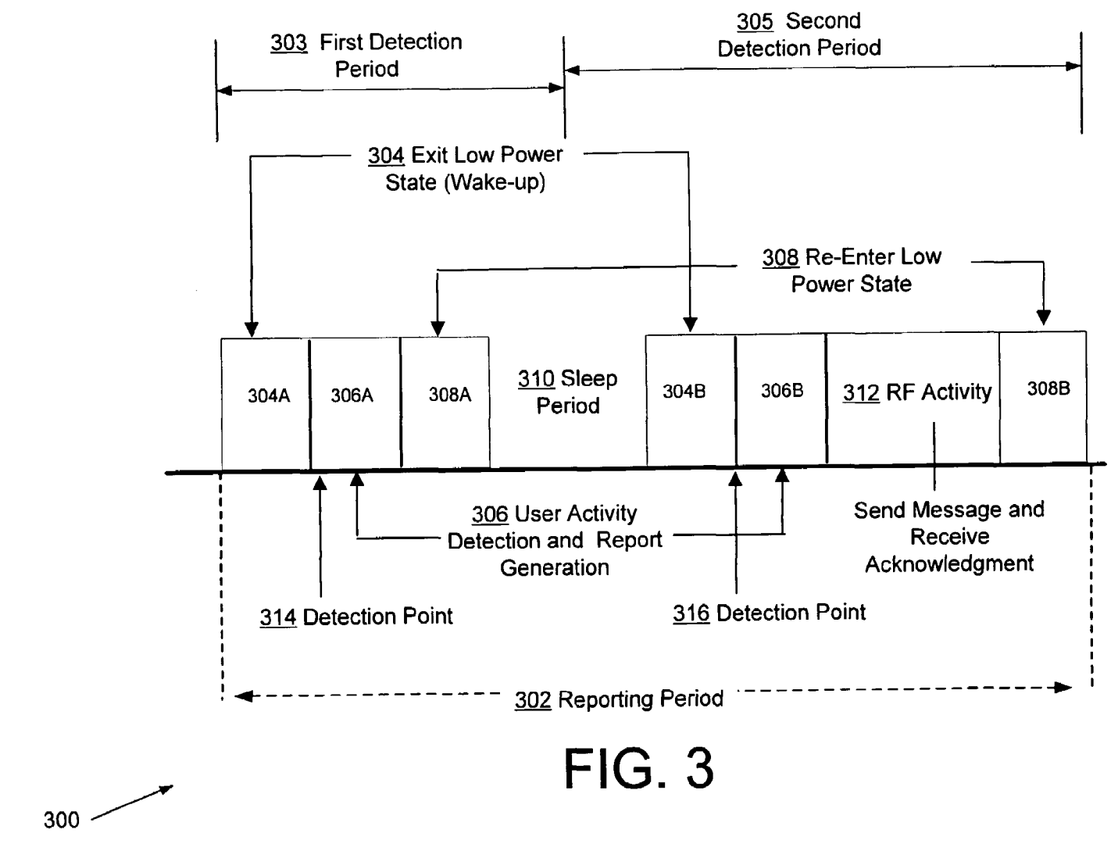
FIG. 3 is a diagram illustrating a process for detecting and reporting user activity according to an example embodiment.

FIG. 3 is a diagram illustrating an example embodiment of a process 300 for detecting and reporting user activity. One reporting period 302 is shown in FIG. 3, although the reporting period may typically repeat itself. The reporting period 302 may include a plurality of detection periods, such as a first detection period 303 and a second detection period 305. While only two detection periods are shown in the reporting period 302 of FIG. 3, a reporting period may include any number of detection periods.

User activity associated with HID 202 may be detected during a detection period, such as detecting user activity once during a detection period. User activity may be detected, for example, at a detection point within each of the detection periods. For example, controller 205 may detect user activity, if any, with respect to HID 202 at detection point 314 for first detection period 303, and detect user activity at detection point 316 for second detection period 305. The detection points may occur anywhere within a detection period, for example.

According to an example embodiment, a message may be transmitted from HID 202 to host computer 204 via wireless link to report detected user activity, if any, at each the plurality of detection points within reporting period 302. HID 202 may transmit the message, reporting detected user activity at a plurality of detection points, during the reporting period 302 or after the reporting period 302, for example.

In an example embodiment, the detection periods, e.g., detection periods 303 and 305, may be equal length periods, or may be different length periods. Likewise, the detection points may be equally spaced or equi-spaced within reporting period 302, or may be at irregular points that may not be equally-spaced, for example.

In an example embodiment, the reporting period 302 may begin at a pre-determined moment, may be triggered by an interrupt, some combination of the two, or at another time. In another example embodiment, the reporting period 302 may begin as soon as the prior reporting period ends. The length of the reporting period 302 may, for example, be any length deemed appropriate. Example factors which may influence the length of the reporting period 302 include but are not limited to: the type of interface device, the type of application or program receiving user activity from the interface device, and/or user defined specific settings. The reporting period 302 may, for example, be determined to be less than a human detectable latency.

At the beginning of the reporting period 302, the HID 202 may wake-up and exit its low power state 304A within fist detection period 303. In another example embodiment, HID 202 may already have begun exiting its low power state 304A before the reporting period 302 begins.

After exiting the low power state at 304A, at the detection point 314, the HID 202 may detect a first user activity, e.g., by controller 205 polling sensor 204. HID 202 may detect user activity and generate a first activity report, if any activity was detected, at 306A. For example, if the HID 202 is a keyboard, a keystroke "x" may be detected, and identified in a first activity report.

HID 202 may then, for example, re-enter its lower power state at 308A and remain in its low-power state throughout the duration of the sleep period 310 in order to conserve battery power. The sleep period 310 may be a time interval during which the device remains in its low power state until the next wake-up at 304B at the beginning of second detection period 305. The length of the sleep period 310 may, for example, be a predetermined length, a dynamically determined length, a length dependent on the type of device, or any other length. HID 202 may, for example, exit its low power state at 304B before the expiration of a pre-determined sleep period 310 due to an interrupt, wherein the interrupt may, for example, indicate a new user activity.

At the expiration of the sleep period 310, HID 202 may wake-up and exit its lower power state at 304B, which may, for example, be the beginning of second detection period 305. At detection point 316, HID 202 may detect a second user activity and generate a second activity report at 306B based on the second user activity detected. For example, a second keystroke "y" may now be detected, and identified in the second activity report.

During the RF activity 312, the wireless interface 206 of HID 202 may transmit a message to the wireless interface 216 of the host computer 214 via wireless link. The wireless interface 216 may then, for example, transmit an acknowledgement that the message has been received by host computer 214. In an example embodiment, the message may include, for example, both the first and second activity reports from the reporting period 302. For example, the message transmitted by HID 202 to host computer 214 may include multiple activity reports from the plurality of detection points within reporting period 302, such as a first activity report indicating activity detected within first detection period 303 and a second activity report indicating the activity detected within second detection period 305, for example.

The message transmitted by HID 202 may include one packet identifying detected user activity for the plurality of detection points (e.g., message includes one packet providing a plurality of activity reports), or may include a plurality of packets, e.g., one packet for each detection point (or one packet for each activity report). In order to conserve battery power, the multiple activity reports, reporting activity at a plurality of detection points within a reporting period, may be transmitted via one wireless message transmission or one RF activity, in an example embodiment.

Therefore according to an example embodiment, by allowing multiple activity reports (e.g., each associated with a detection period or detection point) to be combined into one message and transmitted during the RF activity 312, a higher level of performance may be provided while not significantly decreasing battery life since the number of RF activity 312 periods (or wireless transmissions) required to transmit multiple activity reports may be reduced. Or, by transmitting a message including multiple activity reports (e.g., activity data from multiple detection points or multiple detection periods), either a same performance may be obtained while providing improved battery life, or a substantially improved performance may be provided at approximately the same battery life, according to example embodiments.

The example embodiment 300 shows only two detection points, 314 and 316, during the reporting period 302, however any number of detection points may be included within the reporting period 302. As compared to using one detection point per reporting period (1:1 ratio), the technique described above, employing multiple detection points per reporting period, may increase battery life by decreasing an average amount of time per activity report that HID 202 may be in an active or high power state, thus decreasing power consumption, for example.

For example, if one detection period is provided for each reporting period (one detection point per reporting period), the following data may illustrate some example numbers:

Reporting period: 12.5 ms

Detection period: 12.5 ms

Ratio of detection points/reporting period: 1

Wakeup: 0.5 ms

User activity detection and report generation: 0.5 ms

RF overhead: 0.5 ms

RF activity: 2.5 ms

RF Ramp down: 0.5 ms

Re-entering low power state: 0.5 ms (e.g., stays in low power for remaining 7.5 ms of reporting period)

Total: 5 ms high power over the 12.5 ms reporting period

High Power Period per activity report: 5 ms (since only one activity report is provided per reporting period).

Air bandwidth used: 2/10frames or messages

Compare the above data to an example embodiment where there may be multiple activity reports or multiple detection points within each reporting period (e.g., such as shown in FIG. 3). For example, if user activity is detected twice during a reporting period (two detection points per reporting period), but uses a reporting period that is twice as long, e.g., 25 ms, the following data may illustrate some example numbers for comparison.

Reporting period: 25 ms

Detection period: 12.5 ms

Ratio of detection points/reporting period: 2
For first detection period 303:
    Wakeup 304A: 0.5 ms
    User activity detection and report generation 306A: 0.5 ms
    Re-enter low power state or sleep state 308A: 0.5 ms
For second detection period 305
    Wakeup 304B: 0.5 ms
    User activity detection and report generation 306B: 0.5 ms
    RF overhead (not shown): 0.5 ms
    RF Activity 312 (e.g., to send message including user activity from both detection periods, and possibly to receive Ack): 2.5 ms
    RF ramp down (not shown): 0.5 ms
    Re-enter low power state 308B: 0.5 ms
Total: 6.5 ms of high power over the 25 ms reporting period
High Power Period per activity report: 6.5 ms/2=3.25 ms, which is a 35% savings over the above technique that uses one detection period per reporting period.
Air bandwidth used: 2/20messages or frames, or 1 message for every 10 messages, =10%, which is a 50% savings. Further savings may be obtained by using more than two detection periods (or detection points) per reporting period.

Figure 4:
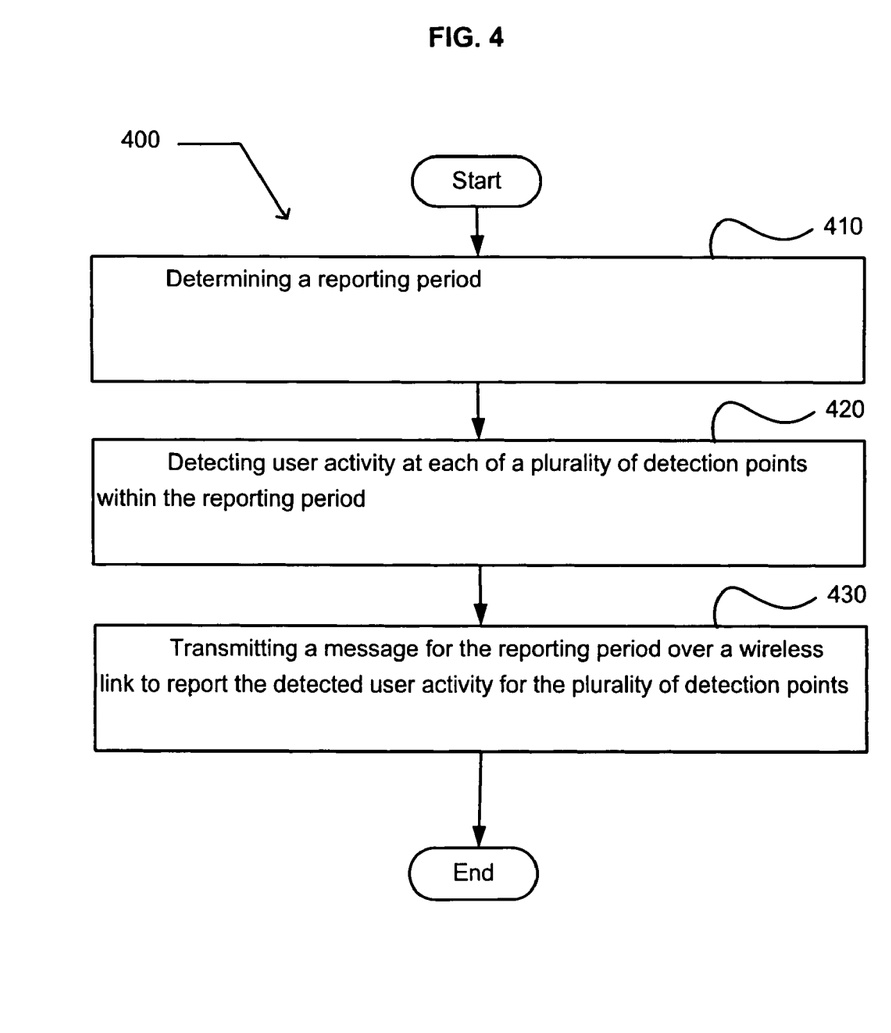
FIG. 4 is a flow chart illustrating a process for detecting and reporting user activity according to an example embodiment.
Figure 5:
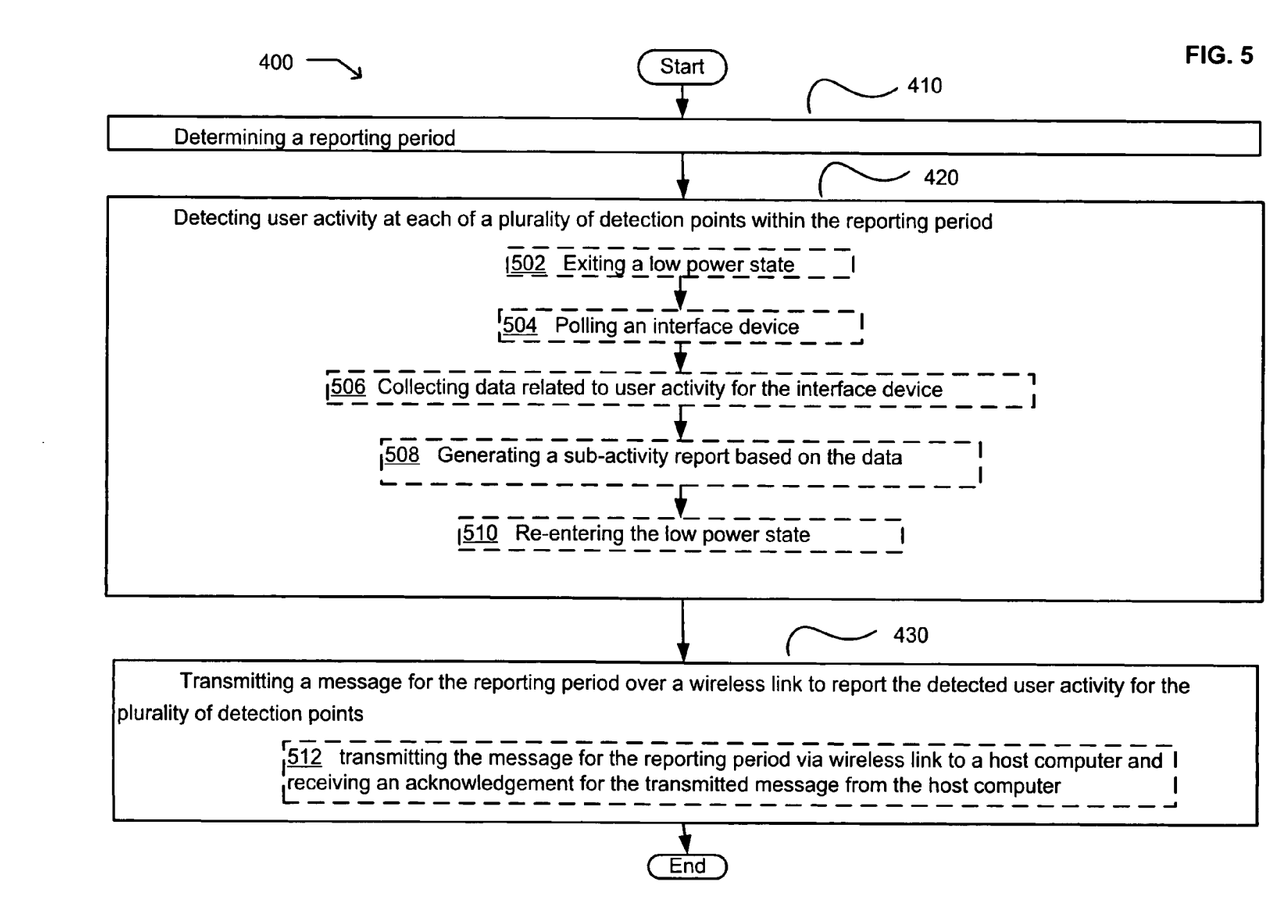
FIG. 5 illustrates alternative embodiments of the example flow chart of FIG. 4 according to an example embodiment.
Figure 6:
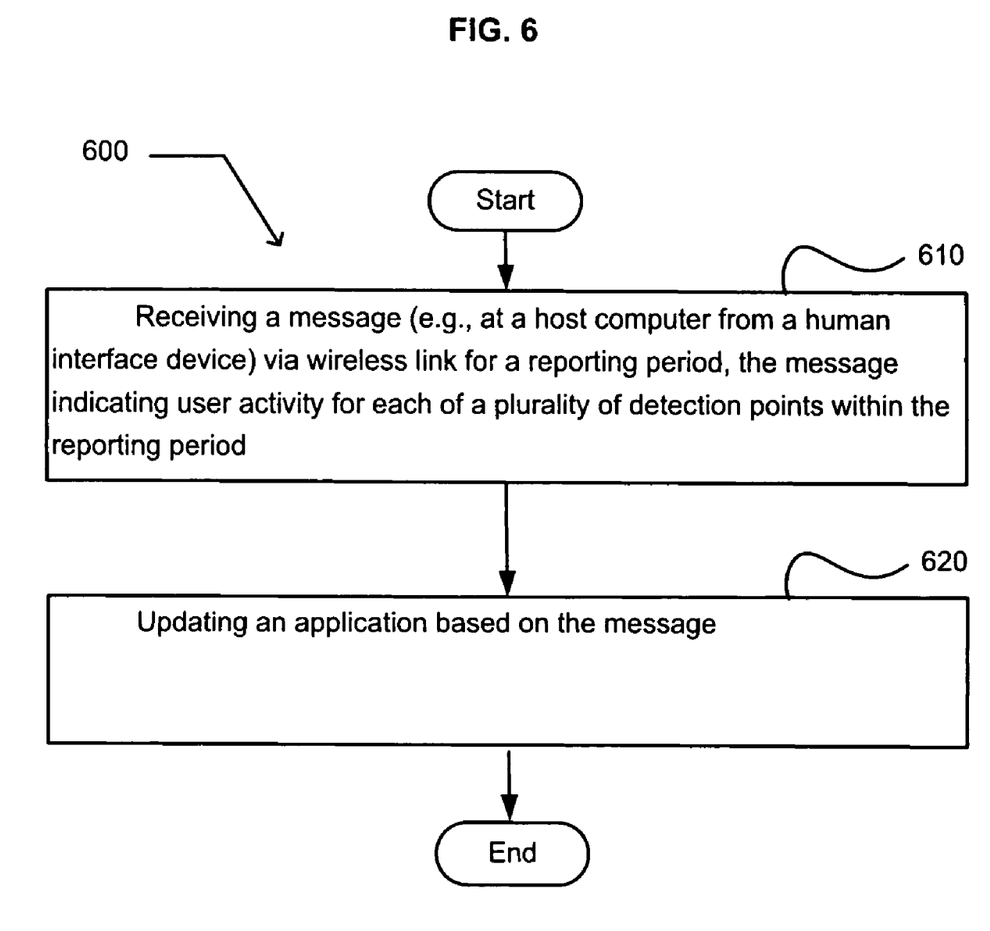
FIG. 6 is a flow chart illustrating an a process for receiving information relating to user activity according to an example embodiment.

FIGS. 4-6 include various examples of operational flows or flow charts, discussion and explanation may be provided with respect to the above-described examples of FIGS. 1, 2 and 3, and/or with respect to other examples and contexts. However, it should be understood that the operational flows may be executed in a number of other environments and contexts, and/or in modified versions of FIGS. 1, 2 and 3. Also, although the various operational flows are presented in the sequence(s) illustrated, it should be understood that the various operations may be performed in other orders than those which are illustrated, or may be performed concurrently.

FIG. 4 is a flow chart illustrating an a process for detecting and reporting user activity according to an example embodiment. After a start operation, the operational flow 400 moves to a determining operation 410 in which a reporting period may be determined, e.g., determined by controller 205. For example, human interface device 202 may have a reporting period 302, which may be variable or it may be static. In an example embodiment, the reporting period 302 may comprise a plurality of detection points 314 and 316 and an RF activity 312 period. A wide variety of factors or criteria may be used to determine or select a reporting period. A reporting period may be different for different HIDs or for different applications or devices receiving activity reports, e.g., at the host computer 214. It may be determined in advance, or on the fly. The determination of the reporting period may, in some cases, include determining other parameters within the reporting period, such as determining the number of detection points or determining the detection period, determining location or timing of detection points, etc.

Then in detecting operation 420, user activity at each of a plurality of detection points within the reporting period may be detected. For example, as shown in FIG. 3, controller 205 may poll sensor 204 to detect user activity at detection points 314 and 316, and activity reports may be generated at 306A and 306B, respectively. Other techniques may be used to detect user activity, such as through interrupts (e.g., via an interrupt from sensor 204 to controller 205), or other techniques.

Then in transmitting operation 430, a message for the reporting period may be transmitted over a wireless link to report the detected user activity for the plurality of detection points. For example, as shown in FIG. 3, during the RF Activity 312 the message may be sent and an acknowledgement received. For example, as shown in FIG. 2, the wireless interface 206 may transmit the message to the wireless interface 216. After receipt of the message, the wireless interface 216 may then, for example, transmit an acknowledgement to the wireless interface 206, although this is not required. The message may include activity reports for each of the plurality of detection points or detection periods, for example, or otherwise indicate user activity at each of the detection points. The message, which may include multiple activity reports, may be transmitted as one packet, or as including multiple packets transmitted during RF activity 312, for example. By transmitting the plurality of activity reports within a wireless message or single RF activity 312, battery power may be conserved. This is because, for example, the time the HID 202 is in a high power state for RF activity 312 to transmit a message including multiple activity reports may be similar to or even the same as (in some cases) the time for RF activity to transmit a single activity report. However, fewer RF or wireless transmissions may be required if multiple activity reports are combined into each message, thereby reducing overall battery consumption in some cases, according to an example embodiment.

FIG. 5 illustrates alternative embodiments of the example flow chart of FIG. 4, according to an example embodiment. FIG. 5 illustrates example embodiments where the detecting operation 420 may include at least one additional operation. Additional operations may include an operation 502, an operation 504, an operation 506, an operation 508, and/or an operation 510.

At the operation 502, the lower power state may be exited. For example, when the reporting period 302 begins, the device may wake-up and exit the lower power state 304A. In some implementations, the device may have already exited the lower power state by the time the reporting period 302 begins.

At the operation 504, an interface device may be polled. For example, after exiting the low power state 304A, sensor 204 of HID 202 may be polled by controller 205 at detection point 314. Any number of detection points or detection periods may be used per reporting period. Improved battery life may be obtained in some cases by using a greater number of detection points per reporting period, and increasing the reporting period, e.g., as noted in the example above. This may result, in some cases, more activity reports being transmitted via a wireless message or RF activity that is performed less frequently, for example.

At the operation 506, data related to user activity for the interface device may be collected. And at the operation 508, an activity report based on the data may be generated. For example, after the interface device is polled at the detection point 314, a first user activity may be detected and a first activity report may be generated at 306A. Then, for example, a second user activity may be detected at detection point 316 and a second activity report may be generated at 306B.

At the operation 510, the low power state is re-entered. For example, after detection point 314, user activity is detected and an activity report is generated at 306A, the low power state may be re-entered at 308A. In another embodiment, for example, after detection point 316, the lower power state may not be re-entered immediately following the detection of user activity and the generation of a activity report. Rather another operation may be performed between the activity report generation at 306B and re-entering the low-power state at 308A, such as RF activity 312. For example, RF activity 312 may be performed during one of the detection periods, such as a last detection period, within a reporting period. For such detection period, the interface device may typically transmit the message via RF activity 312 prior to re-entering low power state at 308B, for example.

FIG. 5 also illustrates example embodiments where the transmitting operation 430 may include at least one additional operation. Additional operations may include an operation 512.

At the operation 512, a message may be sent (or transmitted) and an acknowledgement message may be received. For example, during the RF activity 312, a message may be sent by HID 202 to host computer 214, and an acknowledgement may be received at HID 202 from host computer. The acknowledgement (Ack) may indicate that the message transmitted by HID 202 was successfully received at host computer 214. In some embodiments, for example, the message may contain all or at least a plurality of the activity reports generated after the detection points during the reporting period 302.

In another example, during the RF activity 312, the wireless interface 206 of the human interface device 202 may transmit the message or messages to the wireless interface 216 of the host computer 214. Then, for example, the wireless interface 216 may transmit an acknowledgement or acknowledgements back to the wireless interface 206. In some cases, an acknowledgement may not be transmitted or may be unnecessary, for example.

FIG. 6 is a flow chart illustrating an a process 600 for receiving information relating to user activity according to an example embodiment.

After a start operation, the process proceeds to a receiving operation 610. At receiving operation 610, a message is received via wireless link for a reporting period. The message may indicate user activity for each of a plurality of detection points within the reporting period. For example, a computing device, such as host computer 214, may receive a message from HID 202 indicating user activity for detection points 314 and 316. The message may include, for example, activity reports indicating activity detected at each of the detection points, for example.

Next, the process proceeds to updating operation 620. At updating operation 620, an application may be updated based on the message. For example, an application at host computer 214 may be updated to reflect the detected user activity relating to HID 202. This may involve, for example, moving a cursor in a text application in response to mouse movement, moving a player in a video game in response to detected joystick motion, etc.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A human interface device (HID) operable to communicate via a wireless link, the device comprising:
    a sensor configured to detect user activity associated with the HID;
    a controller coupled to the sensor, the controller configured to perform the following during each of a plurality of detection periods:
        exit, for at least a portion of the HID, a low-power state; and
        identify user activity detected by the sensor; and
    a wireless interface coupled to the controller, the wireless interface configured to transmit a message comprising a combined activity report that indicates the identified user activity from at least two detection periods.

2. The device of claim 1, wherein the controller is further configured to initiate a detection period in response to an interrupt signal from the sensor.

3. The device of claim 1, wherein the controller is further configured to poll the sensor during a detection period.

4. The device of claim 1, wherein the controller is further configured to re-enter, for at least said portion of the HID, the low-power state for a predetermined length of time.

5. The device of claim 1, wherein the controller is further configured to exit, for at least said portion of the HID, the low-power state in response to an interrupt from the sensor.

6. The device of claim 1, wherein the controller is further configured to combine the identified user activity into the combined activity report.

7. A method of operating a human interface device (HID) to communicate via a wireless link, the method comprising:
    detecting user activity associated with a sensor of a HID;
    for each of a plurality of detection periods, performing the following:
        (a) exiting a low-power state; and
        (b) storing information about the detected user activity in a memory;
    combining the stored information for a plurality of the detection periods into a combined activity report; and
    transmitting a message that includes the combined activity report.

8. The method of claim 7, wherein transmitting a message that includes the combined activity report further comprises transmitting the message via a wireless link to a host computer and receiving an acknowledgement for the transmitted message from the host computer.

9. The method of claim 7, further comprising determining a detection period.

10. The method of claim 7, further comprising determining a number of detection periods to perform before transmitting the message.

11. The method of claim 7, further comprising initiating a detection period in response to an interrupt signal from the sensor.

12. A method of operating a host computer that receives user activity messages from a human interface device (HID) via a wireless link, the method comprising:
    during operation of an application program being executed on a host computer, receiving at the host computer a message from a human interface device (HID) via a wireless link, the message comprising a combined activity report indicating information about a first user activity detected by the HID for a first detection period and information about a second user activity detected by the HID for a second detection period subsequent to the first detection period;
    updating the application program in response to the first user activity information; and
    updating the application program in response to the second user activity information.

13. The method of claim 12, wherein the first user activity information and the second user activity information correspond to a first keystroke and a second keystroke, respectively.

14. The method of claim 12, further comprising receiving the message comprising the combined activity report as a single packet.

15. The method of claim 12, wherein the combined activity report further comprises information about a third user activity detected by the HID for a third detection period subsequent to the second detection period, and the method further comprises updating the application program in response to the third user activity information.

* * * * *